March 19, 1957  L. E. PUCHER  2,786,089
BATTERY
Filed Feb. 10, 1954

INVENTOR.
LEO E. PUCHER
BY
ATTORNEYS

United States Patent Office 2,786,089
Patented Mar. 19, 1957

2,786,089
BATTERY

Leo E. Pucher, South Euclid, Ohio, assignor to The Electric Storage Battery Company, Philadelphia, Pa., a corporation of New Jersey Application February 10, 1954, Serial No. 409,471

1 Claim. (Cl. 136—147)

The present invention relates to electric batteries and, more particularly, to electric batteries having flat, plate-like electrodes and to a means for insulating adjacent electrodes.

The principal object of the present invention is the provision of a novel and improved electric battery comprising a plurality of alternately-arranged, positive and negative, flat, plate-like electrodes insulated from one another by sheet-like insulating material folded over opposite side edges of the plates of one polarity and over the lower or bottom edge of the plates of the other polarity.

Another object of the invention is the provision of a novel and improved electric battery comprising a plurality of alternately arranged, flat, plate-like, positive and negative electrodes insulated from one another by sheet-like insulating material interposed therebetween and arranged in such a manner that it does not project materially beyond the edges of the electrodes, thus producing a battery element of minimum size for any given electrode size.

Another object of the invention is the provision of a novel and improved method of making an electric storage battery comprising a plurality of positive and negative, flat, plate-like electrodes which comprises insulating the respective electrodes from one another by enclosing each plate of one polarity in a sheet-like insulating material folded around opposite side edges of the electrode and by enclosing each plate of the other polarity in a sheet of insulating material folded around the lower or bottom edge of the electrode.

Another object of the invention is the provision of a novel and improved electric storage battery of the character referred to in which a plurality of layers of paper-thin sheet-like insulating material is interposed between adjacent battery plates.

Another object of the invention is the provision of a novel and improved method of effectively insulating the plates of batteries with paper-thin sheets of suitable material by providing multiple layers of the material between adjacent plates so that flaws in any one sheet will not materially affect the battery.

The invention resides in certain constructions and combinations and arrangements of parts and other objects and advantages thereof will be apparent to those skilled in the art to which it relates from the following description of the preferred embodiment described with reference to the accompanying drawings forming a part of this specification, in which similar reference characters designate corresponding parts, and in which Fig. 1 is a perspective view of a single cell battery embodying the present invention;

Figure 1:
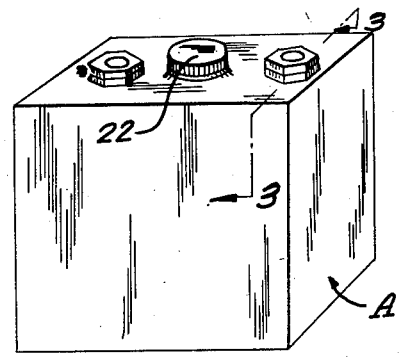
Figure 2:
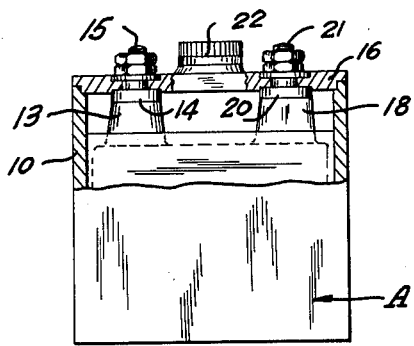
Fig. 2 is a side elevational view of the battery shown in Fig. 1 with part of the case broken away to show the interior construction.
Figure 3:
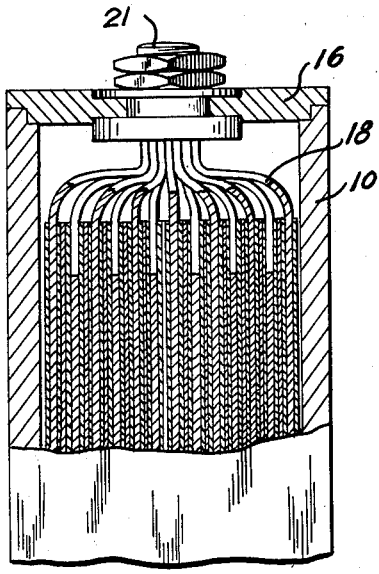
Fig. 3 is a sectional view approximately on the line 3—3 of Fig. 1.

While the invention is applicable to batteries generally, it is particularly applicable to small, compact, so-called deferred action cells and is herein illustrated and described as embodied in a deferred action battery in which the active material of the positive and negative plates are or comprise silver peroxide and/or other higher oxides of silver and zinc, respectively.

Referring to the drawings, the battery illustrated therein and designated generally by the reference character A comprises a case 10 containing a plurality of positive, plate-like electrodes 11 interposed between negative plate-like electrodes 12 and separated from one another in a manner hereinafter specifically described. The positive plates 11 shown each comprises silver oxide, peroxide and/or other higher oxides of silver supported on or carried by a suitable supporting grid, a projection 13 on the upper end of which forms the plate connecting lug through the medium of which the positive plates are all connected to a terminal post strap 14 having a terminal post 15 formed integral therewith and which projects through a cover 16 suitably secured to and closing the upper open end of the case 10.

The negative plates 12 each comprises sponge zinc supported on or carried by a suitable supporting grid, preferably copper, bronze, or silver wire gauze or screen covered with a hard, non-porous zinc coating produced in any suitable manner, as by plating, from an alkaline cyanide bath. Like the grid for the positive plates, the grids for the negative plates have upward projections 18 which serve as plate connecting lugs for connecting the respective negative plates with the negative terminal post strap 20, similar to the positive plate strap 14 but positioned at the opposite end of the battery. The negative post strap has a negative terminal post 21 formed integral therewith and projecting through a suitable aperture in the cover 16.

As is the usual practice, the cover 16 has a filling opening normally closed by a cap 22 and the terminal posts are connected to the cover in such a manner as to prevent leakage of electrolyte thereabout.

Figure 4:
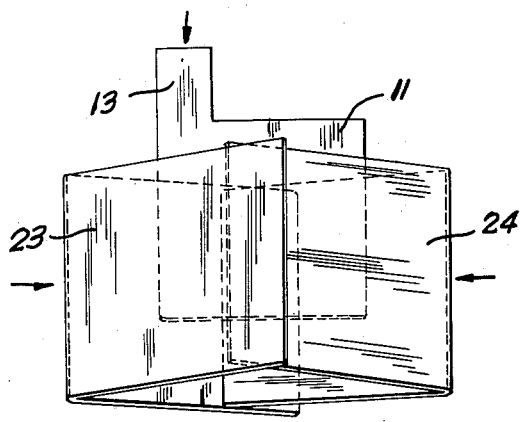
Fig. 4 is an expanded view of the insulating material used for plates of one polarity illustrating its manner of construction and installation on the plate.
Figure 5:
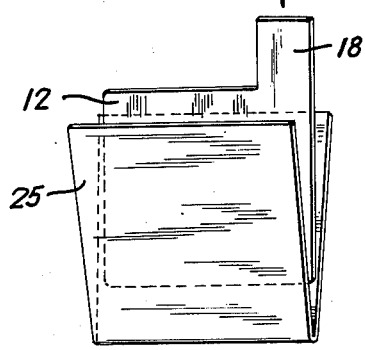
Fig. 5 is a view similar to Fig. 4 but showing an alternative construction.

According to the present invention, the electrodes 11 of one polarity; for example, the electrodes of positive polarity, are insulated by enclosing each in two sheets of insulating material 23, 24. Each sheet of insulating material has a length approximately twice the width of the electrode, is folded along its center line, and is inserted over the electrode so that the folds lie adjacent opposite side edges thereof, as illustrated in Fig. 4. It will be understood that either sheet 23 or 24 can be omitted, if desired, without departing from the scope of the invention. The electrodes 12 of the other polarity; for example, the electrodes of negative polarity, are insulated by enclosing each in a sheet of insulating material 25 having a length approximately twice the height of the electrode. Each sheet is folded along its center line and inserted over an electrode so that the fold lies adjacent to the lower edge thereof, as illustrated in Fig. 5.

Figure 6:
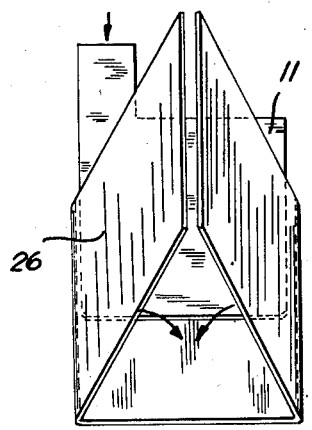
Fig. 6 is an expanded view of the insulating material used for the plates of the other polarity showing its manner of construction and installation on the plate.

As an alternative construction, each of the electrodes of one polarity may be enclosed in a sheet of insulating material 26 having a length approximately equal to three times the width of the electrode, with the sheet wrapped thereabout as illustrated in Fig. 6, so as to be folded over opposite side edges of the electrode.

Subsequent to assembly, the positive and negative electrodes with their respective sheets of insulating material positioned thereabout are stacked or arranged in the usual manner and the plate connecting lugs of the respective positive and negative electrodes welded or otherwise secured to the respective positive and negative terminal post straps 14 and 20, respectively. The cell is then placed in the case 10 and the cover 16 sealed or otherwise secured in position.

With reference to the battery shown in the preferred embodiment, the insulating material is preferably of tissue paper-like character and may be sheets of plastic impregnated non-woven, natural cellulosic material such as "Aldex," "Viskon," "Webril," "Dynel," "Visking," or the like. Attention is called to the fact that with the preferred construction each plate is separated by a plurality of sheets of insulation material, with the result that should a flaw occur in one of the sheets such as might be produced by a separation of the fibers, the danger of a short circuit occurring between the plates is remote as the likelihood of the flaws occurring in aligned positions in adjacent sheets is remote.

From the foregoing description of the preferred embodiment of the invention, it will be apparent that the objects heretofore enumerated and others have been accomplished and that there has been provided an improved battery comprising alternately arranged, flat, plate-like positive and negative electrodes insulated from one another by sheet-like insulating material interposed therebetween and arranged so as not to project materially beyond the edges of the electrodes, thereby producing a battery element of minimum size for any given electrode size and a new and improved method of making the same.

While the preferred embodiment of the invention has been described in considerable detail, the invention is not limited to the particular construction shown and the preferred method of manufacture and it is my intention to cover hereby all adaptations, modifications and uses thereof which come within the practice of those skilled in the art to which the invention relates and within the scope of the appended claims.

Having thus described my invention, I claim:

A silver-zinc battery comprising a plurality of alternately positioned positive and negative electrodes, each of said negative electrodes being enclosed in a sheet of insulating material folded over opposite side edges thereof, and each of said positive electrodes being enclosed in a sheet of insulating material folded over the bottom edge thereof.

References Cited in the file of this patent

UNITED STATES PATENTS

| | | |
|---|---|---|
| 631,796 | Knepper | Aug. 29, 1899 |
| 2,157,629 | Rolph | May 9, 1939 |
| 2,279,318 | Hilger et al. | Apr. 14, 1942 |

FOREIGN PATENTS

| | | |
|---|---|---|
| 1,972 | Great Britain | Dec. 10, 1914 |
| 751,398 | France | June 19, 1933 |